July 6, 1965 W. A. BISBEE ETAL 3,192,806
THREAD CUTTING ATTACHMENT FOR AN ENGINE LATHE AND THE LIKE
Filed July 1, 1963 3 Sheets-Sheet 3
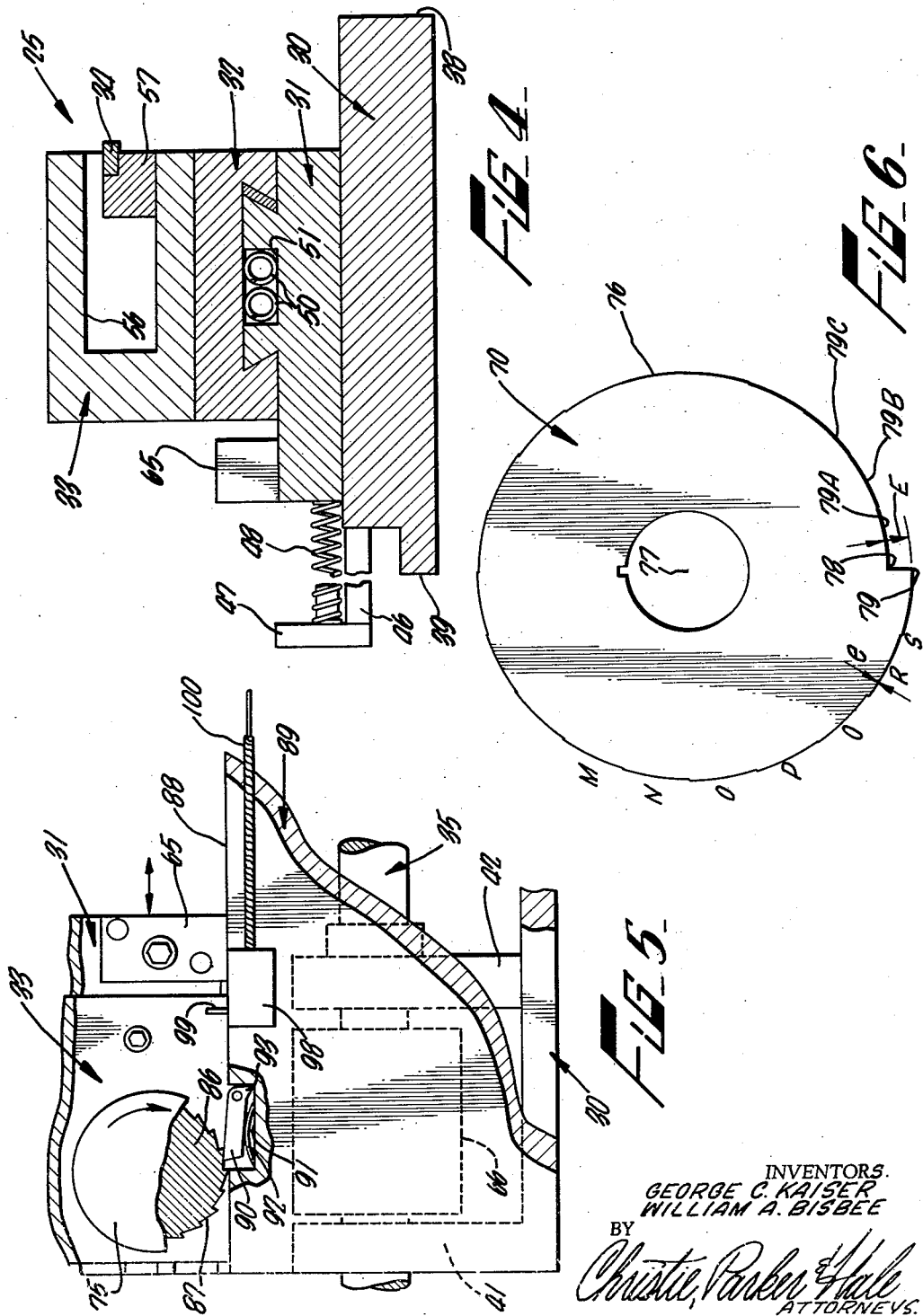
INVENTORS.
GEORGE C. KAISER
WILLIAM A. BISBEE
BY
Christie, Parker & Hale
ATTORNEYS.

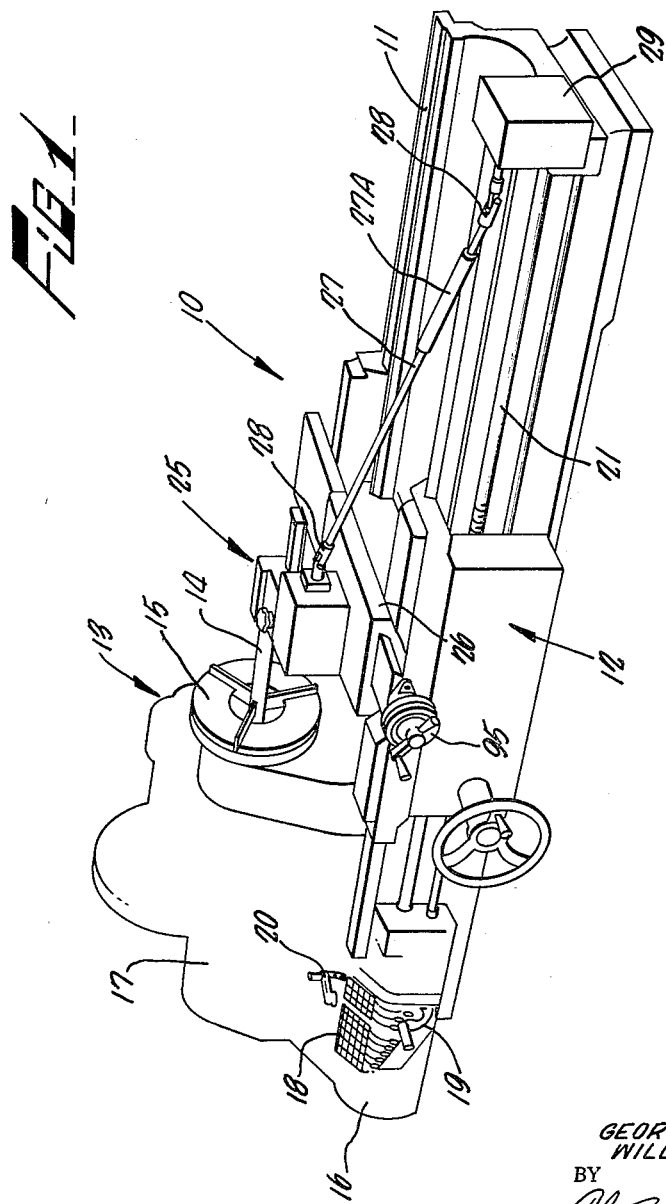

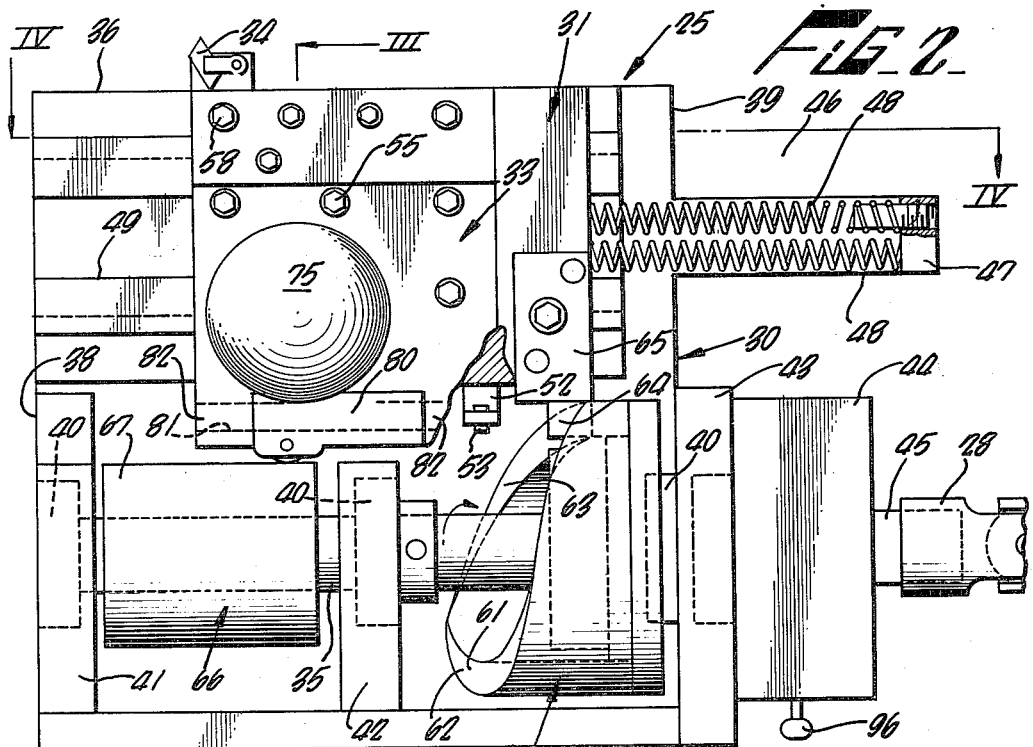
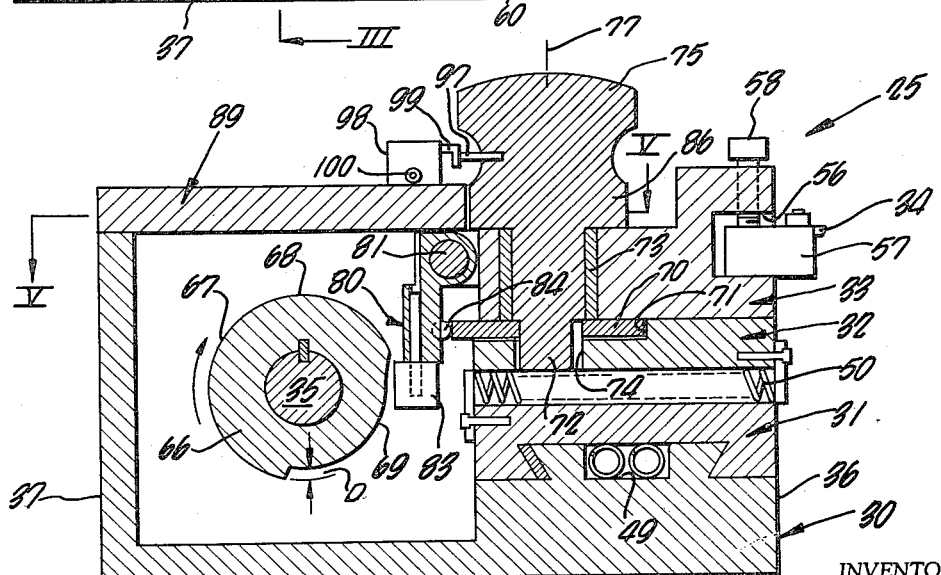

United States Patent Office 3,192,806
Patented July 6, 1965

3,192,806
THREAD CUTTING ATTACHMENT FOR AN ENGINE LATHE AND THE LIKE
William A. Bisbee, Los Angeles, Calif., and George C. Kaiser, 9200 Marshall St., Rosemead, Calif.; said Bisbee assignor to said Kaiser
Filed July 1, 1963, Ser. No. 292,004
13 Claims. (Cl. 82—5)

The present invention relates to thread cutting machines, and more particularly to thread cutting devices as provided in apparatus adapted for attachment to a chuck-type machine tool, such as an engine lathe.

Modern engine lathes are designed so that they may be used to cut threads into a workpiece mounted in a chuck connected to the power driven headstock of the lathe. In order that the lathe may be used to cut threads, it is equipped with a lead screw and a carriage which is slidable along the bed of the lathe. The lead screw conventionally is connected to the headstock through a gear box which is so designed that a large number of gear ratios are available to define the nature of the connection between the headstock and the lead screw. The carriage may be engaged with the lead screw so that the carriage is moved parallel to the axis of rotation of the headstock along the lathe bed at a rate determined by the gear ratio between the headstock and the lead screw and by the pitch of the lead screw. The amount the carriage advances with each rotation of the headstock determines the pitch of the thread to be cut into a workpiece by a cutting tool mounted on the carriage.

The gear boxes on conventional engine lathes are so designed that, where coarse threads are to be cut, the headstock rotates at a slow rate. For example, a widely used engine lathe requires that the headstock rotate at 225 r.p.m. where threads of from 4 to 56 pitch are to be cut. Where threads above 56 pitch are to be cut, the headstock may be driven at speeds up to 1800 r.p.m. The low r.p.m.'s of the headstock, where a screw having from 4 to 56 threads per inch is cut, means that considerable time is required to cut the thread, especially where the thread extends a considerable distance along the workpiece and several passes of the cutting tool are required to cut the thread.

The present invention provides apparatus which may be attached to the carriage of an engine lathe so that the lathe may be used to cut coarse threads at high headstock r.p.m.'s Use of the apparatus of the present invention allows threads to be cut automatically and in a very short time. Where the apparatus is used on the lathe referred to above, the time required to cut a thread along 2 inches of a one inch diameter workpiece is reduced from about 15 minutes to about 15 seconds. Moreover, the present apparatus, because the lathe carriage is not moved during a thread cutting sequence or between such sequences when the workpieces are changed, is capable of producing an indefinite number of perfectly uniform threaded articles.

Briefly stated, the present invention provides apparatus for cutting threads, which apparatus is adapted to be mounted to an engine lathe having a carriage and a rotatable lead screw. The apparatus includes holder means for holding a thread cutting tool and a base member adapted for connection to the lathe carriage for mounting the holder means for reciprocal motion of the holder between spaced apart first and second positions. The apparatus further includes holder drive means engaged between the base member and the holder means for reciprocating the holder means between its first and second positions. The holder drive means is adapted to be operably connected to the lead screw for operation responsive to rotation of the lead screw. The inventive apparatus further includes means for moving the tool along a selected path during each movement of the holder means from its second to its first position. Still further, the present invention also includes indexing means for moving the tool a selected amount laterally of the direction of reciprocal movement of the holder means. The indexing means preferably is operable after each movement of the holder means from its first to its second position.

The above mentioned and other features of the present invention are more fully set forth in the following detailed description and explanation of the invention taken in conjunction with the accompanying drawings, wherein:

FIGURE 1 is a perspective view of an engine lathe in which a thread cutting attachment according to the present invention is mounted to the carriage of the lathe;

FIGURE 2 is a top plan view, with portions broken away, of a thread cutting attachment according to the present invention;

FIGURE 3 is a cross-sectional elevation view taken along line III—III of FIGURE 2;

FIGURE 4 is a cross-sectional elevation view taken along line IV—IV of FIGURE 2;

FIGURE 5 is a top plan view, with parts broken away, of the attachment apparatus showing the operative relation of the structure defining the indexing means for moving the tool laterally of the direction of reciprocal movement of the toolholder means; and FIGURE 6 is a top plan view of a preferred index cam according to the present invention.

In the accompanying drawings and in the following description identical characters refer to identical elements of structure.

Referring initially to FIGURE 1, a conventional engine lathe 10 is shown. Lathe 10 is similar to the lathe illustrated at pages 134 and 135 of "Scientific American," April, 1963, which illustrations are incorporated herein by reference, as though fully set forth at this point, for the purpose of presenting a preferred environment in which the present invention finds utility. Lathe 10 includes a longitudinal bed 11 along which a lathe carriage 12 is slidable parallel to the axis of rotation of a rotatable chuck 15 which is shown as mounting a workpiece 14. The chuck is driven by a headstock, indicated generally at 13. The headstock includes a plurality of gears (see "Scientific American") and a drive motor (see "Scientific American") for rotating the chuck from the motor. A gear box (see "Scientific American") is disposed within a lower front portion 16 of a housing 17 which encloses the headstock machinery. Housing portion 16 includes an index plate 18, a gear shift lever 19, and a speed selector lever 20. The gear box is disposed in operative relationship between the headstock and a rotatable lead screw 21 which extends longitudinally of the front of lathe bed 11. The setting of levers 19 and 20 determines the ratio of r.p.m.'s (revolutions per minute) of the lead screw to the r.p.m.'s of chuck 15. The usual engine lathe is so manufactured that levers 19 and 20 define 48 different gear ratios. The lead screw has a fixed pitch in its threads, say, for example, 6 threads per inch. Accordingly, when the chuck and the lead screw rotate at equal angular velocity, and when carriage 12 is engaged with the lead screw for movement longitudinally of the lathe bed toward or away from the chuck, a selected point on carriage 12 moves 1 inch for each 6 revolutions of a workpiece engaged in chuck 15.

In FIGURE 1, a thread cutting attachment apparatus 25 is mounted to a cross-feed block 26 of carriage 25. In order that the attachment apparatus 25 may be secured to the carriage the swivel and top block (illustrated in the "Scientific American" publication) are removed from the cross-feed block. The thread cutting apparatus is powered by a rotatable drive shaft 27 having a pair of constant velocity universal joints 28 disposed at its opposite end and an extensible spline coupling 27A between the universal joints. The shaft is coupled between the thread cutting apparatus and a gear box 29 connected to the right or tailstock end of lathe bed 11 and powered from lead screw 21. Gear box 29 defines a predetermined gear ratio between its input and its output. In a presently preferred embodiment of the invention gear box 29 defines a 4½:1 step-up in angular motion between lead screw 21 and shaft 27.

As noted above, in conventional engine lathes, the workpiece is caused to rotate at low r.p.m.'s when coarse threads are cut into the workpiece by a thread cutting tool mounted to carriage 12. For the purposes of discussion herein, the term "coarse threads" encompasses threads from about 4–56 threads per inch, although it is understood that the meaning of the term may vary depending upon the nature of the tool with which the apparatus is used and upon the nature of the workpiece to be threaded. In an exemplary engine lathe, such as a 15″ Le Blond engine lathe similar to that illustrated in FIGURE 1, the chuck rotates at 225 r.p.m. when levers 19 and 20 are set so that the headstock rotates from 4–56 times during each inch of travel of the carriage. In modern machining techniques, especially wherein extremely hard workpieces are to be threaded, a headstock rate of rotation of 225 r.p.m. is undesirably low. It is preferred that the headstock be rotated at much higher rates, say on the order of 1800 r.p.m., in order that high-speed steel or carbide cutting tools may be used to best advantage. Further, when the headstock rotates at a relatively low angular velocity, on the order of 225 r.p.m., the thread cutting process often becomes extremely time consuming.

FIGURES 2, 3 and 4 illustrate the thread cutting apparatus 25 according to the present invention. Such apparatus provides an attachment module for an engine lathe. The major structural parts of the module are a base 30, a first or longitudinal slide member 31, a second or cross slide member 32, a tool carriage member 33 adapted to mount a thread cutting tool 34, and a rotatable shaft 35. The combination of the slides and the tool carriage is referred to in the appended claims as "tool holder means." As illustrated more particularly in FIGURE 2, base 30 is of generally rectangular planform configuration and has a rear edge 36, a front edge 37 and left and right edges 38 and 39, respectively. Shaft 35 is mounted adjacent front edge 37 and preferably is disposed parallel to the preferably parallel forward and rear edges. The shaft is rotatably mounted in a plurality of bearings 40 which are disposed in left, central, and right webs 41, 42 and 43, respectively, raised from the generally planar lower portion of the base. The shaft extends laterally through web 43 to a resiliently biased single-dog clutch 44 which has a stub shaft 45 extending therefrom for engagement with universal joint 28 of shaft 27.

The first or longitudinal slide member 31 is mounted to the base for reciprocal movement on the base between spaced apart first and second positions. In the presently preferred embodiment of the invention illustrated in the drawings, the direction of reciprocal movement of the first slide relative to the base is parallel to the axis of rotation of shaft 35. The first position of the slide means is toward right end 39 of base 30, as illustrated in FIGURE 2; the second position is toward left end 38 of the base as approximately illustrated in FIGURE 5. The first slide member is slidably mounted to the base by means of a dovetail connection shown in FIGURE 3. A lateral extension 46 extends beyond right edge 39 of base 30 and terminates in a vertically extending flange 47. A pair of tension springs 48 are engaged between flange 47 and first slide means 31. As best shown in FIGURE 3, springs 48 are disposed in a recess 49 in the male part of the dovetail connection between the base and the longitudinal slide. The springs are effective to bias the longitudinal slide from its second into its first position, that is, from left to right as shown in FIGURE 2.

The second or cross slide member 32 is mounted for slidable movement on the first or longitudinal slide member in a direction preferably at right angles to the direction of reciprocal movement of the first slide member. It is also preferred that the directions of movement of the first and second slide members are in horizontal planes. The slidable movement of the cross slide member relative to the longitudinal slide member is effected by a dovetail connection between these parts, as illustrated in FIGURE 4. A pair of tension springs 50 are disposed in a recess 51 centrally of the male part of the dovetail connection between the slides. The rearward end of springs 50 are secured to the longitudinal slide while the forward ends of the springs are secured to the cross slide so that the cross slide is biased toward shaft 35. Slidable movement of the cross slide toward the shaft is limited by a stop 52 (see FIGURE 2) which extends forwardly from the longitudinal slide and then upwardly to mount an adjustable stop set screw 53 with which the cross slide is abuttable.

Tool carriage 33 is secured to the upper surface of cross slide 32, such as by machine screws 55, so that it moves directly with the cross slide, the cross slide in turn being moved parallel to shaft 35 by movement of the longitudinal slide relative to base 30. A recess 56 is formed in the tool carriage and opens to the rear and left sides thereof, as shown in FIGURES 3 and 4. The recess is provided in order that a tool holder 57, to which thread cutting tool 34 is secured, may be clamped relative to the tool carriage such as by screw 58. The apparatus illustrated in the accompanying drawings is shown as set up for machining an external thread on workpiece 14. Where an internal thread is to be cut, a boring bar having a thread cutting tool attached to one end thereof is engaged in the recess with the elongated extent of the boring bar being disposed parallel to shaft 35 and with the thread cutting tool spaced apart from the tool carriage.

Reciprocal movement of the longitudinal slide is controlled by a drive cam 60 secured to shaft 35 for rotation with the shaft. Preferably the drive cam is disposed between the central and right webs of base 30 and has a working surface 61 which is disposed concentric to the axis of rotation of shaft 35 and opens toward central web 42. The drive cam may be fabricated from a segment of heavy pipe. The working surface of the drive cam is divided into a first portion 62 for controlling movement of the longitudinal slide from its first to its second positions, and a second portion 63 for controlling movement of the longitudinal slide from its second to its first position. The first portion of cam working surface 61 provides linear movement of the first slide from right to left (as viewed in FIGURE 2) and preferably occupies an arc of 240° circumferentially of the drive cam. Similarly, the second portion of the drive cam working surface 61 provides for linear movement of the first slide from left to right and occupies the remainder, or 120°, of the circumference of the drive cam. The distance between the first and second positions of the first slide is controlled by the amount of rise of the drive cam.

Movement of the first slide, as controlled by the drive cam, is transferred from the drive cam to the first slide through drive cam follower means comprised of a rotatable roller 64 rotatably mounted to a block 65 secured to the forward right corner of the first slide means. Preferably, the axis of rotation of roller 64 is about an axis disposed perpendicular to and passing through the axis of rotation of shaft 35. The resilient bias of springs 48 assures that roller 64 is maintained in contact with the drive cam so that the longitudinal slide responds faithfully to the program defined by the working surface of drive cam 60.

The positioning of the second or cross slide, together with the tool carriage including the tool holder 57 and tool 34, is controlled by a hold cam 66 keyed or otherwise secured from angular displacement relative to shaft 35, and disposed on the shaft between the left and central webs of base 30. The hold cam has an elongated extent axially of shaft 35 at least as long as the amount of reciprocal travel of the first slide as defined by the rise of drive cam 60. In a presently preferred embodiment of the invention, each longitudinal element in the cylindrical circumferential surface of the hold cam is disposed parallel of the axis of rotation of shaft 35. The circumference of the hold cam defines a hold cam working surface 67 and is divided into a first portion 68 and a second portion 69. The first portion of hold cam working surface 67 occupies the same arc circumferentially of shaft 35 as does the first portion of drive cam working surface 61 and preferably is exactly in phase with the first portion of the drive cam working surface. Second portion 69 of the hold cam working surface is in phase with the second portion of the drive cam working surface but is spaced inwardly radially of the first portion of the hold cam working surface a distance D as indicated in FIGURE 3. The significance of the distance D will be explained in more detail below. The radius of the first portion of the hold cam working surface is constant over the arc which the first portion 68 subtends about shaft 35.

In cutting a thread in a workpiece, such as workpiece 14 held in chuck 15 of lathe 10, in conjunction with the attachment module provided by the present invention, it is necessary that thread cutting tool 34 trace a series of parallel paths along the workpiece. The movement of the tool in a direction substantially parallel to the axis of rotation of the workpiece is controlled by drive cam 60. As the tool moves along the axis of rotation of the workpiece it cuts material from the workpiece to define the desired thread. In most cases, several passes of the tool along the workpiece are required to properly thread the workpiece. In order to properly cut the thread on the workpiece it is necessary that the tool be indexed toward the axis of rotation of the workpiece after each cutting pass of the tool along the workpiece. It is also necessary, since the return of the cutting tool is twice as fast as the movement of the tool during the cutting pass (such movement being controlled by the second portion of drive cam working surface 61), that the tool be extracted from the thread during return movement of the first slide from its second to its first positions. The movement of the tool out of the thread, when the cutting tool reaches the end of a cutting pass, is controlled by hold cam 66 in a manner described below. The disposition of the tool in a position closer to the axis of rotation of the workpiece during one cutting path than the position occupied by the cutting tool on the prior cutting path is controlled by indexing means mounted to the second slide member and preferably disposed between the second slide member and the hold cam.

The tool indexing means includes an index cam 70 mounted in an upwardly opening recess 71 in the upper surface of cross slide 32. The index cam is keyed or otherwise secured to a vertically extending shaft 72 for rotation with the shaft. Shaft 72 is rotatably mounted in tool carriage 33 by a journal bearing 73 and depends into a coaxially aligned recess 74 in the cross slide. A manually engageable knob 75 is secured to the upper end of shaft 72 and preferably is formed integral with the shafts. Recess 71 opens toward hold cam 66 between the cross slide and holder means 33. The index cam projects rearwardly of the tool carriage out of recess 71 toward the hold cam.

As illustrated more clearly in FIGURE 6, the index cam preferably is substantially planar and has a working surface 76 which defines a spiral about an axis of rotation 77 of shaft 72; the index cam is mounted concentric to axis 77. The index cam working surface defines a program having a beginning point 78 and an end point 79 which are spaced apart from each other radially of the axis of rotation of the index cam by a distance E. The circumference of index cam working surface 76 is divided into a plurality $n$ of preferably equal length stations 79A, 79B, 79C . . . progressing circumferentially of the cam from starting point 78 to end point 79. Distance E is divided into equal increments $e$ corresponding in number to the number of stations circumferentially of the index cam. Each station, such as station 79B, is radially displaced outwardly of the preceding station, such as station 79A, by a distance equal to one of the increments $e$. In a presently preferred index cam for use in the present invention, there are 20 stations 79A, 79B, 79C . . . circumferentially of cam 70 and each is spaced .002 inch outwardly radially of the station preceding, and $E=(n)(e)=(20)(.020)=0.40$ inch.

Hold cam follower means are disposed between the hold cam and tool carriage 33. The hold cam follower means is also operatively engaged with index cam 70. As illustrated in the accompanying drawings, the hold cam follower means includes a pendulum member 80 hinged at its upper end about a shaft 81 disposed parallel to shaft 35 and mounted to the tool carriage by a pair of lugs 82 which extend toward shaft 35 from the upper extent of the tool carriage. The pendulum member depends from shaft 81 to a lower end to which a hold cam follower roller 83 is mounted for rotation about a preferably substantially vertical axis. Index cam follower means are connected to the pendulum member preferably intermediate the elongate extent of the pendulum member between shaft 81 and roller 83. In a presently preferred embodiment of the present invention, the index cam follower means takes the form of a rotatable ball 84 secured to the forward side of pendulum member 80 as shown in FIGURE 3. The ball shown is merely a preferred type of index cam follower and any other suitable follower is within the scope of the present invention.

The distance of ball 84 from shaft 77 is dependent upon the radial distance between shaft 77 and the station 79A, 79B, 79C . . . with which the ball is engaged. This distance is added to the lateral distance between the point of engagement of the ball with index cam 70 and the point of engagement of the hold cam follower with the hold cam. This total distance is variable and, in part, defines the displacement of cutting tool 34 during a given cutting pass of the tool (i.e., during the movement of the longitudinal slide from its first to its second position) from a selected path (fixed relative to shaft 35) along which the tool moves as the first slide moves from its second to its first position. As described more fully below, the selected path is defined by engagement of the cross slide with stop screw 53. As the index cam is progressively stepped angularly about axis 77, the total distance described above is increased by the radial offset $e$ between adjacent stations of cam surface 76 as magnified by the hold cam follower means. The magnification of each increment $e$ by the pendulum member is caused by the difference in distance from shaft 81 to the index cam follower as compared with the distance from shaft 81 to the point of contact of roller 83 with the hold cam. In a preferred embodiment of the present invention, the index cam follower is disposed one half the distance from shaft 81 to the point of engagement of roller 83 with hold cam 66. Accordingly, each increment $e$ is magnified two-fold when taken at the hold cam follower so that the path the cutting tool follows on one cutting pass is displaced .040 inch from the path the tool traversed on the prior cutting pass.

Index cam advancing means are provided as a part of attachment module 25 for advancing the index cam a selected amount, preferably in a clockwise direction, after each movement of the longitudinal slide from its first to its second position. The advancement of the index cam causes the ball 84 to become engaged with the station of the index cam working surface next succeeding the station with which the ball was engaged as the longitudinal slide moved from its first to its second position. Accordingly, the distance between shaft axis 77 and the point of engagement of ball 84 with index cam surface 76 is increased a distane $e$; this increment is magnified at the hold cam follower as described above.

In a presently preferred embodiment of the invention the index cam advancing means includes a ratchet wheel 86 disposed coaxially of shaft 72. As illustrated in FIGURE 5, wheel 86 is defined by the lower portion of knob 75 and includes a series of ratchet teeth 87 disposed circumferentially of the ratchet wheel. Preferably there are $n$ ratchet teeth; that is, the number of ratchet teeth defined by ratchet wheel 86 corresponds to the number of stations 79A, 79B . . . circumferentially of the index cam. The ratchet wheel is disposed adjacent the rear edge of tool carriage 33 so as to just clear forward edge 88 of a cover 89 for the attachment module. The cover is disposed over base webs 41, 42, 43, as shown in FIGURES 3 and 5.

A ratchet pawl 90 is disposed in a recess 91 formed in the forward edge of module cover 89. The pawl is pivoted to the cover at its forward end and is resiliently biased by a leaf spring 92 so that the left end of the pawl projects toward the tool carriage. Preferably the right front corner of the pawl defines a lip 93 which engages the right side and the forward side of recess 91 to limit the distance which the pawl moves angularly about its pivot.

As the cross slide is moved from right to left, as viewed in FIGURE 5, the ratchet wheel slides over the projecting tip of pawl 90. It is noted that the pawl is not normally engaged in any manner with the ratchet wheel during such movement of the cross slide since the cross slide is normally disposed away from cover 89 because of engagement of roller 83 with hold cam 66, as described below. As the cross slide reaches the limit of its travel from right to left, the rotation of hold cam 66 causes disengagement of the cam from roller 83 as the second portion of hold cam control surface 67 is disposed adjacent the roller. Springs 50 urge the cross slide toward shaft 35 until such movement of the cross slide is limited by engagement with stop screw 53. Simultaneously with movement of the cross slide toward shaft 35, the longitudinal slide is caused to move from left to right by engagement of roller 64 with second portion 63 of drive cam working surface 61. As the longitudinal slide moves from left to right, it carries the cross slide from left to right parallel to shaft 35. The ratchet wheel moves past pawl 90 and one of teeth 87 is engaged by the projecting end of the pawl to index the ratchet wheel a predetermined amount in a clockwise direction sufficient to cause the next station of index cam 70 to be engaged with ball 84. In other words, if ball 84 was engaged with station 79B as the cross slide moved from right to left, then the cam is indexed clockwise an amount sufficient to cause ball 84 to be engaged with station 79C as the cross slide moves from left to right.

It was mentioned above that hold cam follower roller 83 is disengaged from the hold cam as the longitudinal slide moves from its second to its first position. As seen in FIGURE 3, hold cam second portion 69 is spaced inwardly from first portion 68 a distance D which is at least as great as distance E times the magnification factor of pendulum member 80. The selected path which cutting tool 34 moves along as the tool carriage is moved from left to right is defined by the position which the cross slide occupies relative to shaft 35 by reason of the positioning of the cross slide by stop screw 53. When the cross slide is engaged with the stop screw and when ball 84 is engaged with the last station of the index cam adjacent terminal point 79, clearance is provided between roller 83 and hold cam portion 69. This clearance assures that the cross slide does in fact engage the stop screw and assures that the tool will in fact follow a preselected path during each movement of the tool from left to right regardless of the station of cam 70 with which ball 84 is engaged.

The structural characteristics of the present invention described above will be more clearly understood from a description of the operation of the attachment module. If it is assumed that a tubular workpiece is engaged in lathe chuck 15 for threading of, say, the exterior of the workpiece for 1½" adjacent its cantilevered end, then the attachment module is set up as illustrated in the accompanying drawings. A cutting tool, such as cutting tool 34, is secured to the tool carriage. Attachment module 25 is secured to the upper surface of lathe carriage cross-slide block 26, as shown in FIGURE 1, and shaft 27 is coupled to gear box 29. If the threads are to be cut on workpiece 14 so as to be parallel to the axis of rotation of chuck 15, then the module is aligned on cross-slide block 26 so that the direction of reciprocal movement of first slide 31 is parallel to the axis of rotation of the workpiece. If tapered threads are to be cut, then the module is mounted to the cross-slide block so that the reciprocal movement of the first slide is skew to the axis of rotation of the workpiece by an angle equal to one-half the angle of taper of the desired threads. This adjustability of the module relative to the cross-slide block is permitted by the use of bolts similar to those which secure the lathe swivel block (see the "Scientific American" publication) to the cross-feed block.

After the module has been properly secured to the lathe carriage, the index cam is set to that station of the index cam which corresponds to the beginning of the threading program which is to be performed by the module. For example, if five cutting passes are required to cut a thread of the desired depth, then index cam station 79N (the sixth station from the end of the index cam program) is aligned adjacent ball 84. This initial setting of the index cam preferably is accomplished manually merely by grasping knob 75 and rotating the knob to the proper position. The device is then rendered inoperative either by disengaging the lead screw from the headstock, or by disengaging shaft 27 from the module by releasing clutch 44. With the workpiece rotating, the tool may then be moved along the workpiece to assure that the workpiece is properly aligned in chuck 15. Once the machinist is sure that the workpiece is properly mounted, the module is positioned at a predetermined location axially of the workpiece which places the left limit of cutting tool movement at the left end of the portion of the workpiece to be threaded. It was mentioned above that drive cam 60 has a 2" rise, but it has been assumed that the thread to be cut in workpiece 14 extends only 1½" along the workpiece from the extreme right end of the workpiece. Accordingly, the cutting tool is positioned ½" away from the unsupported end of the workpiece. The position of the starting point of the program laterally from the axis of rotation of the workpiece is controlled by moving the cross feed block transversely of the lathe bed by operation of a transverse micrometer feed wheel 95 normally provided as a portion of the lathe. In the foregoing discussion of the set-up of module 25 relative to workpiece 14, it has been assumed that longitudinal slide 31 is maintained at its first position.

The module is then operatively engaged with the lathe either by engaging shaft 27 with shaft 35 by operation of clutch 44, or by engaging lead screw 21 in driven relation with the headstock. In either case the desired thread pitch has been preset into the lathe and the module by the machinist's operation of levers 19 and 20 controlling the gear ratio between chuck 15 and lead screw 21. As the module is rendered operative, shaft 35 begins to rotate and drives the longitudinal slide from its first to its second positions, so that the cutting tool moves axially of the workpiece. Consistent with the above set up procedure, this first pass of the cutting tool along the workpiece does not cause any material to be cut from the workpiece since the index cam has been positioned merely for aligning the workpiece in its chuck. If it is desired that the first pass of the tool along the workpiece be a cutting pass, then the operator merely indexes the index cam one station clockwise before applying power to the module. As the longitudinal slide reaches its second position (the left position in the accompanying drawings), the hold cam is moved into such a position that roller 83 is disengaged from the hold cam. Accordingly, springs 50 act to move the cross slide away from the workpiece into the base position of the cross slide and the cutting tool is disengaged from the workpiece. Springs 43 then become operative to induce the longitudinal slide to move from left to right in a movement controlled by second portion 63 of drive cam working surface 61. As the longitudinal slide moves from left to right carrying the tool carriage with it, the ratchet mechanism is operated to advance the index cam to its next station, station 79O. Continued rotation of shaft 35 eventually engages roller 64 with first portion 62 of drive cam working surface 61 to commence another transit of the cutting tool from right to left. At the same instant that the second transit of the cutting tool from right to left is started, roller 83 engages portion 63 of the hold cam so that the tool is moved toward the axis of rotation of the workpiece and comes to rest at a point closer to the workpiece axis than it occupied on its first cutting path by an amount equal to distance $e$ amplified by the magnification factor (2:1) of the pendulum member.

The cutting operation then proceeds as described above with reciprocal movement of the cutting tool axially of the workpiece, the cutting tool being withdrawn from the thread as the tool reverses motion to travel from left to right. Ultimately, the last station of index cam 70 is passed and ball 84 is caused to engage station 79A. At this point the operator may operate clutch 44 by manual operation of a clutch release lever 96 (see FIGURE 2) or by disengaging lead screw 21 from the headstock. The cutting sequence is thus completed and the workpiece may be removed from the lathe so that another workpiece may be inserted for threading by the module according to the process described above.

Rather than require the machinist to manually terminate the program of the module, apparatus is provided for shutting off operation of the module when the index cam is indexed so that the ball 84 passes over the step of the index cam between the end and the beginning of the spiral defined by the index cam. This shut down apparatus includes a pin 97 secured to knob 75 above ratchet wheel 86 and disposed relative to the index cam so that its free end is disposed farthest to the rear of the module when ball 84 is engaged with station 79A. A latch mechanism 98 for releasing the resilient bias of clutch 44 is mounted to the upper surface of cover 89 and has a forwardly extending trip finger 99 which is engaged by rod 97 when the longitudinal carriage approaches its extreme right hand position after the ratchet wheel has been rotated to cause ball 84 to pass from the last station of the index cam to station 79A. Movement of trip finger 99 actuates a Bowden-type cable 100 which extends from release mechanism 98 to clutch 44. Preferably the clutch is resiliently biased into coupling engagement between shafts 35 and 45 so that movement of cable 100 releases a mechanism within the clutch to disengage shaft 35 from rotation with stub shaft 45. The mechanism for resiliently loading the clutch, as described above, is accomplished by conventional means and is not a portion of this invention and therefore is not illustrated. When the clutch is disengaged, lever 96 may be operated manually to reset the clutch. It is thus seen that the invention includes means for sensing the end of the module program and for disengaging the module when the indexing means reaches the end of its program.

It was noted above that clutch 44 is a single dog clutch. The use of such a clutch assures that the cutting tool always commences a cutting pass relative to a workpiece at a predetermined position angularly of the workpiece. If a double dog clutch is used, the cutting tool might engage the workpiece on the particular cutting pass at a point 180° out of phase with the point of which the tool engaged the workpiece on a prior cutting pass. It is understood that the ratio of r.p.m.'s of shaft 35 to the r.p.m.'s of the workpiece is expressible by a rational fraction, that is, a fraction in which both the numerator and denominator are integral numbers. Such a rational ratio is defined by gear-box 29 and by the gears engaged between head screw 21 and the headstock mechanism.

The apparatus described above is a presently preferred embodiment of the invention adapted for converting a particular lathe into a high speed thread cutting machine. Also, the apparatus described above is designed for cutting threads not to exceed 2″ in length since the drive cam has been referred to as having a 2″ rise. It is within the scope of the present invention however, that different profiles may be imparted to the drive cam, to the hold cam, and to the index cam without departing from the scope of this invention. The design of alternate cam configurations are deemed to be within the talents of those skilled in the art and in large measure is dictated by the characteristics of the machine with which the module is used and by the nature of the threads to be cut in a particular workpiece. This is not to say that the present apparatus is restricted to cutting threads of only a single pitch; the pitch of a thread to be cut by the apparatus of the present invention may be varied by changing the gear ratios defining the connection between the headstock and the lead screw of a lathe with which module 25 is used.

The invention has been described above in combination with a conventional engine lathe. It should be apparent to those skilled in the art that an engine lathe is the most likely machine tool with which the present invention may be used. The attachment module described above, however, may be used in conjunction with a drill press, boring mill, or some other machine tool in which a power take-off is or may be provided for rotating shaft 35 in synchronism with a workpiece.

It is noted that roller 64 is mounted to longitudinal slide 31 in such manner that there is no lost motion between the program defined by drive cam 60 and the longitudinal slide. This is so to assure that each movement of tool 34 along the workpiece follows exactly the desired path and provides for precise threading by module 25.

While the invention has been described above in conjunction with specific apparatus, this has been by way of example only and is not to be considered as limiting the scope of the present invention.

What is claimed is:

1. Apparatus for cutting threads and adapted to be mounted to a machine tool having a carriage and a rotatable chuck adapted to hold a workpiece, the apparatus comprising
   (a) holder means for holding a thread cutting tool,
   (b) a base member adapted for connection to the machine tool carriage and mounting the holder means for reciprocal motion of the holder means between spaced apart first and second positions,
   (c) holder drive means engaged between the base member and the holder means for reciprocating the holder means and adapted to be operably connected in driven relation to the chuck for operation responsive to rotation of the chuck,
   (d) means for moving the tool along a selected path fixed relative to the chuck axis of rotation during each movement of the holder means from its second to its first position, and
   (e) indexing means for moving the tool a selected amount laterally of the selected path after each movement of the holder means from its first to its second position, each movement of the tool by the selected amount being added to the total of prior such movements.

2. Apparatus for cutting threads and adapted to be mounted to an engine lathe and the like having a carriage and a rotatable lead screw, the apparatus comprising:

(a) a base member adapted for connection to the lathe carriage, (b) first slide means movably mounted to the base member for reciprocal movement relative thereto between first and second positions thereof spaced along a first line, (c) second slide means adapted for holding a thread cutting tool mounted to the first slide means for guided movement relative thereto along a second line transversely of the first line, (d) drive means engaged between the base member and the first slide means for reciprocating the first slide means along the first line and including (i) a rotatable shaft disposed substantially parallel to the first line and adapted to be operably connected to the lead screw for rotation thereof responsive to rotation of the lead screw, (ii) a drive cam secured to the shaft for rotation therewith and defining a working surface opening along the shaft circumferentially thereof, the working surface having a first portion for controlling movement of the first slide means from the first to the second position and having a second portion controlling motion of the first slide means from its second to its first position, and (iii) drive cam follower means carried by the first slide means and engaged with the drive cam working surface, (e) means for defining a predetermined position of the second slide means relative to the first slide means and for moving the second slide means into the predetermined position during each movement of the first slide means from its second to its first position, and (f) indexing means for moving the second slide means a discrete distance laterally of the first line toward the workpiece before each movement of the first slide means from its first to its second position, each said discreet distance being cumulative to the sum of such distances the second slide means is previously indexed.

3. Apparatus for cutting threads and adapted to be mounted to the carriage of an engine lathe having a rotatable chuck for holding a workpiece to be threaded and a rotatable lead screw, the apparatus comprising:

(a) a base plate adapted to be fixedly secured to the lathe carriage, (b) a first slide mounted to the base plate for reciprocation relative thereto along a first line, (c) a second slide mounted to the first slide for reciprocation relative thereto along a second line transverse to the first line, (d) a tool holder carried by the second slide, (e) means for moving the first and second slides along the first and second lines, respectively, including (i) a rotatable shaft mounted to the base plate parallel to the first line and adapted to be rotated in response to rotation of the lead screw, (ii) a first slide drive cam carried by the shaft and having a control surface opening along the shaft circumferentialy thereof, (a) the drive cam control surface having a rise portion and a fall portion, (b) the rise portion controlling movement of the first slide along the line between spaced first and second positions, (iii) a drive cam follower secured to the first slide and engageable with the drive cam control surface, (iv) means for biasing the drive cam follower into continuous engagement with the drive cam, (v) a second slide hold cam carried by the shaft and having a cylindrical control surface the elements of which are parallel to the shaft, (a) the hold cam control surface having a circularly cylindrical hold portion and an idle portion axially aligned with the drive cam rise and fall portions, respectively, (b) the hold portion having a greater radius than the idle portion, (c) the hold cam extending along the shaft a distance at least as great as the distance between the first slide first and second positions, (vi) a hold cam follower carried by the second slide and engageable with the hold cam, (vii) means connected to the second slide for biasing the second slide toward the hold cam, and (viii) stop means for limiting movement of the second slide toward the hold cam so that the hold cam follower engages only the hold cam hold portion thereby causing the second slide and a tool engaged in the tool holder to move along a fixed course parallel to the first line as the first slide moves along the first line from its second to its first position, and (f) means for causing the tool to move along a straight path on the second and each succeeding movement of the first slide from its first to its second position, which path is displaced a selected amount from the parallel to the path along which the tool moved during the preceding movement of the first slide from its first to its second position, said means including (i) a spiral tool feed cam rotatably mounted to the second slide, (ii) a feed cam follower carried by the second slide and coupled to the hold cam follower, and (iii) means for indexing the feed cam a selected amount during movement of the first slide from its second to its first position.

4. Apparatus according to claim 3 wherein the hold cam follower comprises a lever pivotally connected at one end of the second slide and engageable with the hold cam at its other end, the feed cam has a predetermined maximum throw, the feed cam follower is carried by the lever at a location spaced from the one end thereof, and the hold cam and idle portions are spaced from each other radially of the shaft a distance greater than said feed cam throw times (the mechanical advantage ratio of (the distance along the lever from said one end to the hold cam follower) to (the distance along the lever from said one end to the feed cam follower)).

5. Apparatus according to claim 3 wherein the feed cam defines a program according to which the tool is advanced to the workpiece, and means for manually overriding an initial portion of the program so that advancement of the tool is controlled by the remainder of the program.

6. Apparatus according to claim 2 wherein the means for moving the second slide comprises a hold cam secured to the shaft and defining a working surface having a first portion and a second portion, the first portion of the hold cam working surface being aligned axially of the shaft with the first portion of the drive cam working surface and being of equal extent circumferentially of the shaft as the first portion of the drive cam working surface, the second portion of the hold cam working surface being disposed inwardly radially of the first portion of said cam, and hold cam follower means engageable with the hold cam mounted to the second slide means, means for biasing the second slide means toward the hold cam, and stop means for limiting movement of the second slide means toward the hold cam so that the hold cam follower means never engages the second portion of the hold cam but assumes a predetermined position relative thereto between the hold cam first and second portions when the hold cam second portion is adjacent the hold cam follower means.

7. Apparatus according to claim 6 wherein the hold cam follower is pivotally mounted to the second slide means and the indexing means comprises a rotatable index cam mounted to the second slide means and having a working surface varying in extent radially of the axis of rotation of said cam according to a predetermined pattern, means for engaging the hold cam follower with the index cam working surface, and means responsive to movement of the first slide means from its second to its first positions for rotating the index cam a selected amount during each said movement of the first slide means.

8. Apparatus according to claim 7 wherein the hold cam follower is disposed between the index cam and the hold cam and comprises a pendulum member pivoted at its upper end to the second slide means and depending therefrom to a lower end, roller means at the pendulum member lower end engageable with the hold cam first portion, and index cam follower means mounted to the pendulum member below its upper length engaging the index cam.

9. Apparatus according to claim 7 wherein the means for rotating the index cam comprises a ratchet wheel mounted coaxially of the index cam for rotation therewith, and a resiliently biased pawl mounted to the base adjacent second slide means for engaging the ratchet wheel.

10. Apparatus according to claim 2 wherein the hold cam follower comprises a pendulum member pivoted at its upper end to the second slide means adjacent the hold cam and engageable at its lower end with the hold cam first portion, the indexing means comprises a rotatable index cam rotatably mounted to the second slide means and having a working surface defining a spiral about the axis of rotation of said cam, index cam follower means mounted to the pendulum member intermediate the ends thereof engaging the index cam working surface, and means for rotating the index cam a selected amount during each movement of the first slide means from its second to its first position to increase by a second selected amount the distance of the location of the index cam follower means from the axis of rotation of the index cam, the discrete distance the second slide means is indexed laterally being the second selected amount magnified by the ratio of the length of the pendulum member to the distance of the index cam follower means from the pendulum member upper end.

11. Apparatus according to claim 10 wherein the distance the hold cam second portion is disposed inwardly of the first portion of said cam exceeds the total of said second selected amounts indicated by the index cam as magnified by the pendulum member.

12. Apparatus for cutting threads and adapted to be mounted to an engine lathe having a carriage, a rotatable chuck for holding a workpiece to be threaded and a rotatable lead screw, the apparatus comprising
(a) holder means for holding a thread cutting tool,
(b) a base member adapted for connection to the lathe carriage and mounting the holder means for reciprocal motion of the holder means between spaced apart first and second positions,
(c) holder drive means engaged between the base member and the holder means for reciprocating the holder means and adapted to be operably connected to the lead screw for rotation of the lead screw.
(d) means for moving the tool along a selected path, parallel to the line of reciprocation of the holder means and fixed relative to the chuck axis of rotation during each movement of the holder means from its second to its first position.
(e) programmed means for indexing the tool a selected amount laterally of the selective path,
(i) each indexing causing the tool to follow a path during movement of the holder means from its first to its second position which is parallel to and spaced said selected amount from the path the tool travelled during the next prior movement of the holder means from its first to its second position,
(ii) said programmed means including a spiral cam defining a program having a beginning and an end,
(iii) each selected amount of movement of the holder means being cumulative with prior selected amounts from the beginning of the program, and
(f) means for disengaging operation of the holder drive means when the programmed means passes the end of the program.

13. Apparatus according to claim 12 wherein the holder drive means comprises a first shaft rotatably mounted to the base member parallel to the direction of reciprocal movement of the holder means and means for disengaging operation of the holder drive means comprises a resiliently biased clutch mounted to the base member and operably connected to the first shaft, a second shaft releasably engageable to the first shaft by the clutch and adapted for rotation in response to rotation of the lead screw, the clutch being operated against the resilient bias thereof to couple the first shaft to the second shaft, a clutch release trip mechanism secured to the base member, and a trip finger mounted to the holder means and movable by operation of the programmed means into operative relation with the trip mechanism at the end of said program to release the coupling of the second shaft to the first shaft.

References Cited by the Examiner

UNITED STATES PATENTS

| | | | |
|---|---|---|---|
| 2,903,933 | 9/59 | Mackenzi | 82—5 |
| 3,016,777 | 1/62 | Garombo | 82—5 |
| 3,073,194 | 1/63 | Ciccarelli | 82—5 |
| 3,111,050 | 11/63 | Ciccarelli | 82—5 |

FOREIGN PATENTS

| | | |
|---|---|---|
| 958,891 | 2/57 | Germany. |
| 716,188 | 9/54 | Great Britain. |
| 535,380 | 11/55 | Italy. |

WILLIAM W. DYER, JR., *Primary Examiner.*